United States Patent [19]

Terai et al.

[11] Patent Number: 5,349,472
[45] Date of Patent: Sep. 20, 1994

[54] COUPLED LENS ASSEMBLY

[75] Inventors: Takashi Terai; Takayuki Yoshioka, both of Tokyo, Japan

[73] Assignee: Pioneer Electronic Corporation, Tokyo, Japan

[21] Appl. No.: 911,672

[22] Filed: Jul. 9, 1992

[30] Foreign Application Priority Data

Jul. 12, 1991 [JP] Japan .................................. 3-172125
Jul. 12, 1991 [JP] Japan .................................. 3-172126

[51] Int. Cl.$^5$ ............................ G02B 3/00; G02B 9/00
[52] U.S. Cl. ................................. 359/649; 359/793; 359/796
[58] Field of Search ............................ 359/649–651, 359/793, 796; 351/159

[56] References Cited

U.S. PATENT DOCUMENTS 4,015,897 4/1977 Konoma et al. .................... 359/740
4,679,918 7/1987 Ace .................................. 351/159

*Primary Examiner*—Scott J. Sugarman
*Attorney, Agent, or Firm*—Kane, Dalsimer, Sullivan, Kurucz, Levy, Eisele and Richard

[57] ABSTRACT

A coupled lens assembly comprises a plurality of lens units coupled by an intermediate layer disposed between the adjoining lens units, the intermediate layers being formed of an additional type silicone filler. A coupled lens assembly comprises a plurality of lens units coupled by an intermediate layer disposed between the adjoining lens units and formed of a bonding agent. Each of the lens units has a central lens portion and a peripheral portion surrounding the central lens portion and wherein one of the adjoining lens units has a flanged portion formed to a peripheral portion and the other one of the adjoining lens units has an engaging portion formed to the peripheral portion to be engaged with the flanged portion when both the lens units are coupled with optical axes of both the lens units being aligned. A groove is formed to at least one of the peripheral portions of the adjoining lens units for receiving an excessive fillet such as bonding agent when the filler is excessively applied and/or a discharge passage is formed to at least one of the peripheral portions of the adjoining lens units for discharging the excessive filler outward the coupled lens assembly. The groove may be formed so as to communicate with the discharge passage.

12 Claims, 3 Drawing Sheets

COUPLED LENS ASSEMBLY

BACKGROUND OF THE INVENTION

This invention relates to a coupled lens assembly having substantially no optical axis shifting and no bonding failure between lens units constituting the coupled lens assembly.

A coupled lens assembly composed of a plurality of lenses bonded together has been widely utilized for, for example, a projection device of a projection type television.

Such a coupled lens assembly is usually formed by bonding, through intermediate bonding agent layers, a plurality of glass lenses or plastic lenses having different refractive indexes from each other. Particularly, a coupled lens assembly formed by the plastic lenses has a light weight as a whole in comparison with a coupled lens assembly formed by the glass lenses, and moreover, each of the plastic lenses has degree of molding freedom in its nature. Furthermore, the plastic lens can be easily formed to an aspherical lens, which is extremely difficult to be formed by the glass lens. In view of these facts and advantages of the plastic lenses, recently, the usage thereof has been widely developed.

In a typical coupled lens assembly of the character described above, there is provided one formed by bonding a concave lens made of, for example, polycarbonate, a convex lens made of, for example, acrylate resin and a bonding agent layer interposed between these concave and convex lens. The concave lens has a central recessed lens portion and a peripheral flat surface portion surrounding the central lens portion, and the convex lens also has a central protruded lens portion and a peripheral flat surface portion surrounding the central lens portion. In such conventional coupled lens assembly, the protruded lens portion of the convex lens is fitted into the recessed lens portion of the concave lens with the flat portions formed at peripheral portions of both the concave and convex lens portions being face to face bonded through the intermediate bonding agent layer.

With respect to such coupled lens assembly, in a case where the intermediate bonding agent layer is formed by so called a solvent type, the materials constituting the concave and convex lenses are affected or damaged by the solvent and, in another aspect, when the solvent is volatiled, the volume of the intermediate bonding agent layer is itself reduced, resulting in the change of the optical characteristic or performance of the coupled lens assembly in time elapsing, thus providing a significant problem. In view of such problem, in the prior art, there is provided an epoxy resin series bonding agent is utilized for forming the intermediate bonding agent layer.

However, the epoxy resin series bonding agent forming the intermediate layer of the conventional coupled lens assembly has a cure shrinkage coefficient of about 5 to 8% and in comparison with the solvent type bonding agent, the shrinkage after the curing is remarkably small, but in an optical view point, the lens surface is deformed after the curing, thus affecting on the initial optical characteristic or performance.

In another view point, since the peripheral portions of both the concave and convex lenses are formed to be flat, it is difficult to align optical axes of both the lenses at a time of bonding these lenses with high performance, which requires a troublesome working for making align the optical axes of these lenses. Moreover, even after once making alignment, both the optical axes are sometime shifted. When a lot of the bonding agent is used for bonding these lenses, an excessive amount of the bonding agent is flew outward through the flat surface portion between both the lenses, making worse the workability at the assembling of the coupled lens assembly. For this reason, there is a problem for using sufficient amount of the bonding agent and when the bonding agent is used in less amount, there may cause a case where air bubbles are formed inside the bonding agent layer, resulting in a bonding failure and hence not achieving a desired optical characteristic or performance.

SUMMARY OF THE INVENTION

In view of the above defects or drawbacks encountered in the prior art, an object of this invention is to provide a coupled lens assembly capable of causing no deformation of the lens surface after the curing of the intermediate bonding agent and achieving a desired optical characteristic and performacne having exact alignment of the optical axes of the concave and convex lenses.

Another object of this invention is to provide a coupled lens assembly capable of preventing the convex and concave lenses from defectively bonding as well as achieving a desired optical performance.

These and other objects can be achieved according to this invention by providing, in one aspect, a coupled lens assembly comprising a plurality of lens units coupled by an intermediate layer disposed between the adjoining lens units, the intermediate layers being formed of an additional type silicone filler, In another aspect, there is provided a coupled lens assembly comprising a plurality of lens units coupled by an intermediate layer disposed between the adjoining lens units and formed of a bonding agent, each of the lens units has a central lens portion and a surface portion surrounding the central lens portion and wherein one of the adjoining lens units has a flanged portion formed to a peripheral portion and the other one of the adjoining lens units has an engaging portion formed to the peripheral portion to be engaged with the flanged portion when both the lens units are coupled with optical axes of both the lens units being aligned.

In a further aspect of this invention, these embodiments can be combined such that engaging structure of the flange and engaging portion of the second aspect will be incorporated in the first aspect.

Furthermore, in both the aspect, each of the lens units has a central lens portion and a peripheral surrounding the central lens portion and a groove is formed to at least one of the peripheral portions of the adjoining lens units for receiving an excessive filler such as bonding agent when the filler is excessively applied and/or a discharge passage is formed to at least one of the peripheral of the adjoining lens units for discharging the excessive filler outward the coupled lens assembly. The groove may be formed so as to communicate with the discharge passage.

According to the first aspect of this invention, the intermediate layer formed between the adjoining lens units coupled is formed of an additional type silicone filler. The silicone filler has extremely less shrinkage property after the curing thereof, so that the lens surface is hardly deformed after the curing. The silicone filler includes no solvent, so that the problems caused by the use of the solvent type bonding agent as the intermediate layer can be eliminated, thus achieving the optically stable characteristic performance of the coupled lens assembly.

According to another aspect, the flanged portion is formed to the periphery of one of the adjoining lens units and the engaging portion is formed to the periphery of the other one of the adjoining lens units. The flanged portion is engaged with the engaging portion when both the lens units are coupled with the optical axes of these lens units being aligned. Accordingly, after the positioning, i.e. coupling, of the lens units, the optical axes never be shifted. Furthermore, the groove and the discharge passage may be formed, so that, if an excessive amount of the bonding agent is applied, the bonding agent is received in the groove and further excessive bonding agent is applied, the bonding agent is flew outward through the discharge passage. Such flew bonding agent can be easily removed. Accordingly, a sufficient amount of bonding agent can be supplied, preventing the lens units from adversely bonding and hence achieving the desired optical performance.

BRIEF DESCRIPTION OF THE DRAWINGS

For a better understanding of this invention and to show now the same is carried out, reference will be made, by way of preferred embodiments, to the accompanying drawings, in which.

DESCRIPTION OF THE PREFERRED EMBODIMENTS

Figure 1:
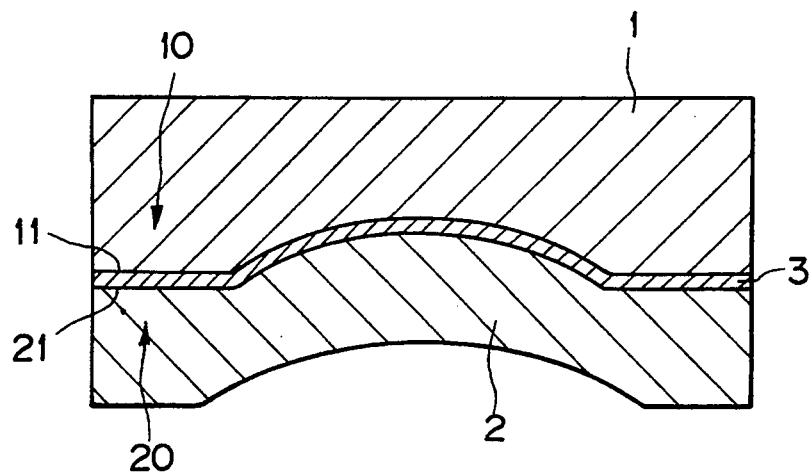
FIG. 1 is a sectional view of a coupled lens assembly according to one embodiment of this invention.

FIG. 1 shows a sectional view of a coupled lens assembly according to one embodiment of this invention, in which the coupled lens assembly is composed of a concave lens 1 and a convex lens 2 which are bonded through an intermediate layer 3.

The concave and convex lenses 1 and 2 may be each formed of optical glass or plastic material but having different refractive indexes or Abbe's numbers or both from each other. It is preferred to utilize the plastic material, and more preferably, a polycarbonate (PC) resin, polystyrene (PS) resin, styrene-acrylonitrile copolymer (MS) resin, polymethel methacrylate (PMMA) resin, polydiethylene glycol bisarylcarbonate (PEDC) resin, poly-4-methylpenten-1 (TPX) resin.

More concretely, it is desired to form the concave lens 1 of a plastic material such as PC resin or PS resin having high optical dispersion property and to form the convex lens 2 of a plastic material such as PMMA resin, PEDC resin, TPX resin having low optical dispersion property. Further, it is to be noted that the MS resin may be utilized as a plastic material having high or low optical dispersion property by changing a mixing ratio of the PS resin and the PMMA resin.

In the present embodiment, the concave lens 1 is formed of the PC resin and the convex lens 2 is formed of the PMMA resin, in which both the lenses are formed so that the concave lens 1 formed of the PC resin has a refractive index of 1.53 and the convex lens 2 formed of the PMMA resin has refractive index of 1.49. A coupled lens composed of these concave and convex lenses 1 and 2 both formed of the aforementioned materials and having these refractive indexes may be preferably utilized as a projection device of a projection type television.

These concave and convex lenses 1 and 2 may be coupled through an intermediate layer 3 in a manner, for example, as shown in FIG. 1, in which flat surface portions 11 and 21 formed to the peripheral portions 10 and 20 of the recessed and protruded lens portions of the concave and convex lenses 1 and 2 are face to face bonded by way of the intermediate layer 3.

The intermediate layer 3 disposed between the opposing faces of the concave and convex lenses 1 and 2 is formed of an additional type silicone filler, and such additional type silicone filler has a character to be cured by a heat curing method, a room temperature curing method or ultraviolet (UV) rays applying method, and more particularly, an additional type silicone rubber or additional type silicone gel will be utilized for the additional type silicone filler. It is preferred that each of such material for the intermediate layer 3 has cure shrinkage coefficient of generally less than 1% and, preferably, about 0.2% and also has a refractive index of generally 1.40 to 1.53 and, preferably, 1.49 to 1.53. Such additional type silicone filler will be easily available as a commercially sold silicone potting material for electrical use such as TSE 3062 by TOSHIBA SILICONE K.K. or commercially sold UV curing type liquid state silicone such as TFC 7770 or TFC 7870 by TOSHIBA SILICONE K.K.

The intermediate layer 3 is formed by the additional type silicone filler so as to have a thickness of 0.1 to 2 mm and, preferably 0.1 to 1 mm. Since the intermediate layer 3 is formed by the additional type silicone filler, the shrinkage property after the curing is extremely reduced, but since the layer 3 has a flexibility after the curing, if one of lenses 1 and 2 be deformed by heat, humidity or the like, the influence of the deformation of one lens hardly affects on the other one lens, thus being advantageous, In another view point of the coupled lens assembly according to this invention, the optical axes alignment of both the concave and convex lenses are achieved by the following embodiment with reference to FIGS. 2 and 3.

Figure 2:
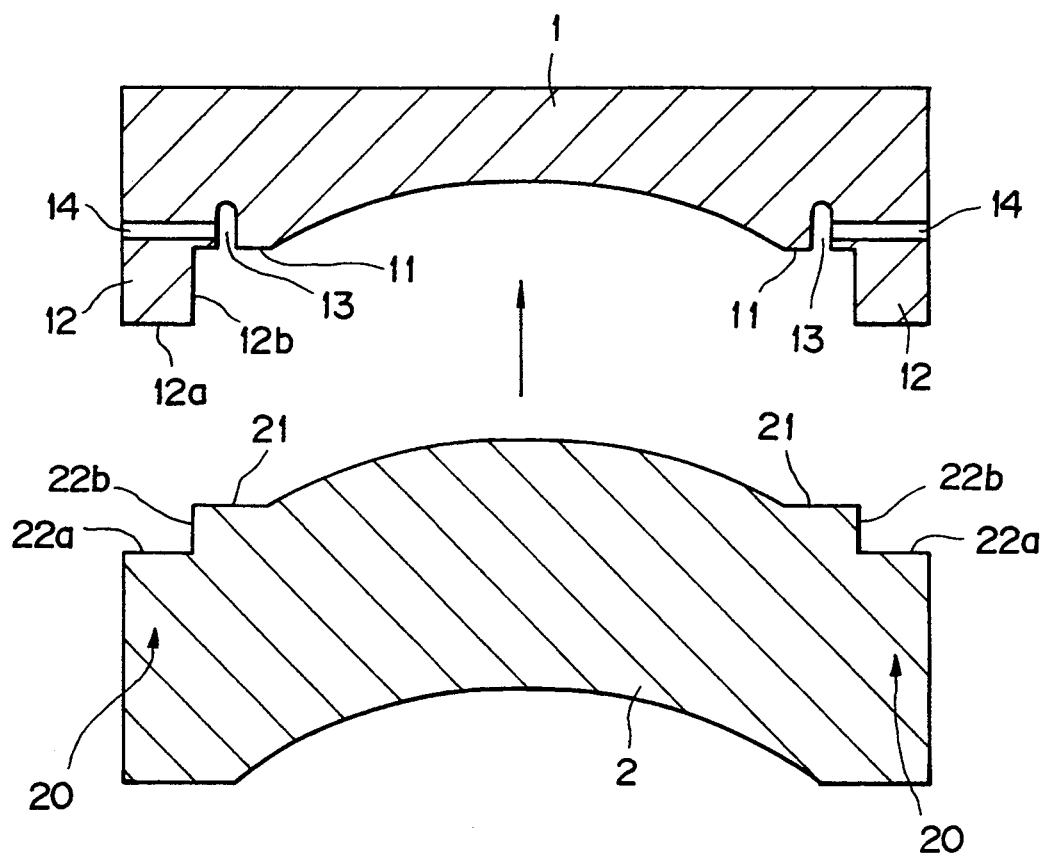
FIG. 2 is a sectional view of a coupled lens assembly in a developed state of another embodiment of this invention.

Referring to FIG. 2, the concave lens 1 is formed with the central recessed lens portion, a flat surface portion 11 surrounding the central recessed lens portion and a flanged portion 12 formed to the outer peripheral portion 10 of the flat surface portion 11. The convex lens 2 is formed with a central protruded lens portion, a flat surface portion 21 surrounding the central protruded lens portion and an engaging portion 22a and 22b formed to the outer peripheral portion 20 of the flat surface portion 21.

As shown in FIG. 2, a groove 13 is formed to the flat surface portion 11 of the concave lens 1 to receive an excessive filler such as bonding agent and a discharge passage 14 may be further formed to the flanged portion 12 as occasion demands so as to escape outward the excessive bonding agent. The discharge passage 14 may be formed so as to communicate with the groove 13. In an alternation, though not shown, the groove 13 and the discharge passage 14 may be formed to the flat surface portion of the convex lens 2. Furthermore, the groove 13 and the discharge passage 14 may be formed to the concave and convex lenses, separately. The groove 13 may be formed to show various cross section such as U shape. Furthermore, the discharge passage 14 may be shaped like a hole or a groove.

Figure 3:
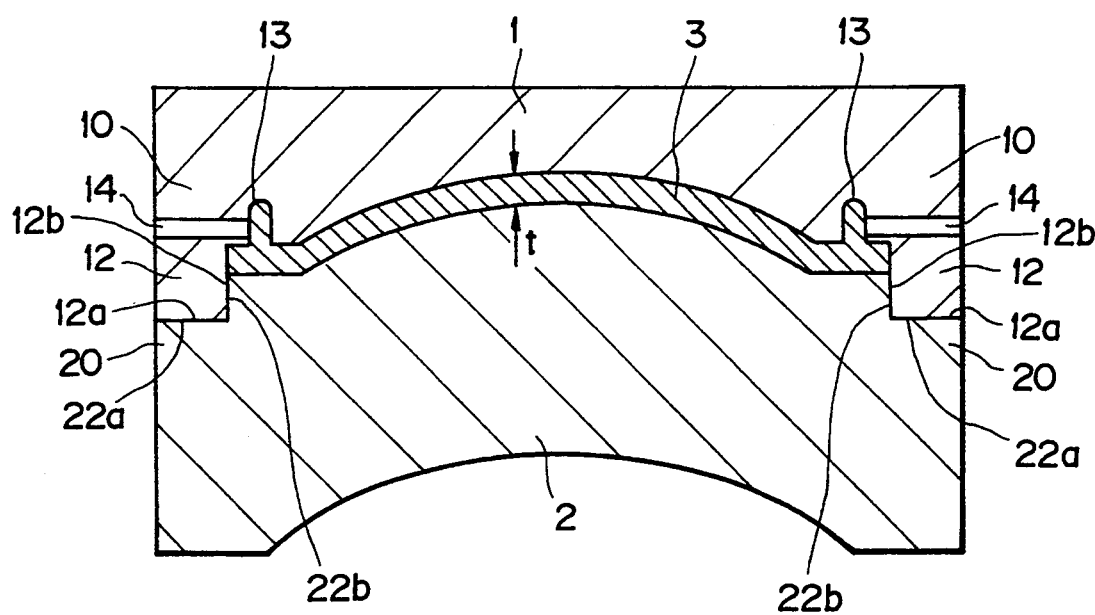
FIG. 3 is a sectional view of the coupled lens assembly shown in FIG. 2 in a coupled state.

In this embodiment, as shown in FIG. 3, when the coupled lens assembly is composed, these concave and convex lenses 1 and 2 are mated with the optical axes being aligned and bonded by a bonding agent, which forms an intermediate layer 3. In this state, the flanged portion 12 of the concave lens 1 is firmly engaged with the engaging portion 22a and 22b of the convex lens 2, whereby the optical alignment of the axes of the concave lens 1 and the convex lens can be achieved.

A distance t between the surface portions of the recessed lens portion of the concave lens 1 and the protruded lens portion of the convex lens 2 is determined, by an engaging surface 12a of the flanged portion 12, that is by the difference between the projecting length of the flanged portion 12 and the recessed length of the engaging portion 22a. The optical alignment can be done by the engaging surface 12b of the flanged portion 12 and surface 22b of the convex lens 2. Usually, the distance t has a length of 0 to 2.0 mm, and preferably, of 0.1 to 1.0 mm.

It will be of course understood that the embodiment represented by FIGS. 2 and 3 is easily applicable to the embodiment shown in FIG. 1, and such combination, an amplified function and effect can be achieved.

In an application, the coupled lens assembly according to this invention will be formed by coupling more than two lenses of the structures and characters described above in substantially the same manner as described hereinbefore. Namely, a plurality of lens units constituting concave and/or convex lenses may be coupled through an intermediate filler, such as bonding agent, layer between the adjoining lens units.

Figure 4:
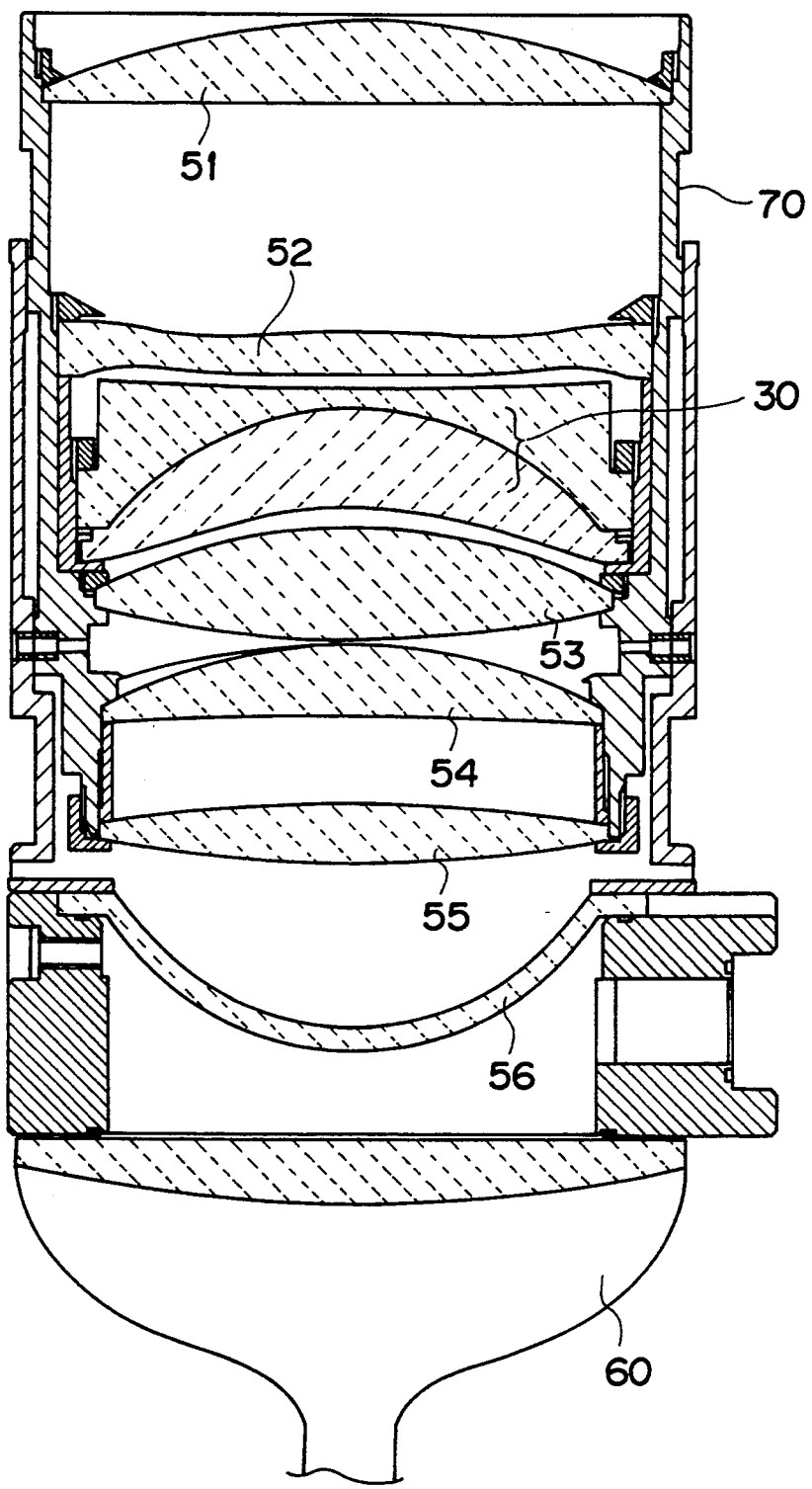
FIG. 4 is an elevational section of a projection device of a projection type television utilizing the coupled lens assembly of this invention.

An preferred application of the coupled lens assembly according to this invention will be shown as one example in FIG. 4, which shows a projection device of a projection type television in which a coupled lens assembly 30 is utilized in combination with the other lens units 51, 52, 53, 54, 55 and 56, a cathode ray tube 60 and a frame member 70.

What is claimed is:

1. A coupled lens assembly comprising:
a plurality of lens units coupled, in which each of said lens units has a central lens portion and a peripheral portion surrounding the central lens portion, one of adjoining lens units has a flanged portion formed to a peripheral portion and the other one of the adjoining lens units has an engaging portion formed to the peripheral portion to be engaged with the flanged portion when both the lens units are coupled with optical axes of both the adjoining lens units being aligned;
an intermediate layer disposed between the adjoining lens units formed of a bonding agent; and
at least one of a groove and a discharge passage formed to at least one of the peripheral portions of the adjoining lens units for receiving any excessive bonding agent when the bonding agent is excessively applied.

2. A coupled lens assembly according to claim 1, wherein the intermediate bonding agent layer is formed of an additional type silicone filler.

3. A coupled lens assembly according to claim 2, wherein the additional type silicone filler has a coefficient of cure shrinkage of less than 1% and a refractive index of 1.40 to 1.53.

4. A coupled lens assembly according to claim 3, wherein a preferable coefficient of cure shrinkage of the additional type silicone filler is of about 0.2% and a preferable refractive index thereof is of 1.49 to 1.53

5. A coupled lens assembly according to claim 3, wherein the additional type silicone filler is a silicone rubber.

6. A coupled lens assembly according to claim 3, wherein the additional type silicone filler is a silicone gel.

7. A coupled lens assembly according to claim 1, wherein the one of the adjoining lens units comprises a concave lens surface and the other one of the adjoining lens units comprises a convex lens surface.

8. A coupled lens assembly according to claim 1, wherein the groove communicates with the discharge passage.

9. A coupled lens assembly according to claim 1, wherein the discharge passage is shaped like a hole.

10. A coupled lens assembly according to claim 1, wherein the discharge passage is shaped line a groove.

11. A coupled lens assembly according to claim 1, wherein each of the lens units is formed of a plastic material.

12. A coupled lens assembly according to claim 1 wherein said discharge passage is formed for discharging the excessive bonding agent outward of the coupled lens assembly.

* * * * *